United States Patent
Leete (10) Patent No.: US 6,721,815 B1
(45) Date of Patent: Apr. 13, 2004

(54) METHOD AND APPARATUS FOR ITD SCHEDULING

(75) Inventor: Brian A. Leete, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 318 days.

(21) Appl. No.: 09/966,947

(22) Filed: Sep. 27, 2001

(51) Int. Cl.$^7$ ............................................. G06F 13/00
(52) U.S. Cl. ......................... 710/6; 710/52; 710/305; 710/310; 709/100; 709/101; 709/102; 713/502
(58) Field of Search .......................... 710/6, 52, 305, 710/310; 709/1, 100, 101, 102; 713/502

(56) References Cited

U.S. PATENT DOCUMENTS

| | | | | |
|---|---|---|---|---|
| 5,367,678 A | * | 11/1994 | Lee et al. ................... 709/104 |
| 5,850,508 A | * | 12/1998 | Lee et al. ................... 714/20 |
| 5,933,611 A | * | 8/1999 | Shakkarwar ................ 710/100 |
| 6,272,515 B1 | * | 8/2001 | Fouquet ..................... 709/101 |
| 6,349,354 B1 | * | 2/2002 | Garney ...................... 710/313 |
| 6,625,602 B1 | * | 9/2003 | Meredith et al. .............. 707/8 |

* cited by examiner

Primary Examiner—Rehana Perveen
(74) Attorney, Agent, or Firm—Blakely, Sokoloff, Taylor & Zafman LLP (57) ABSTRACT

A device is presented including a host controller to generate a transaction schedule. The transaction schedule includes many transactions. The transactions are stored in many data structures. Each of the data structures contain initialized transactions or initialized and non-initialized transactions. The host controller executes the transactions that are initialized and the data structures each contain a pointer to the next initialized transaction.

19 Claims, 9 Drawing Sheets

| 31 30 29 28 27 26 25 24 23 22 21 20 19 18 17 16 15 14 13 12 11 10 9 8 | 7 6 5 4 | 3 | 2 1 0 | |
|---|---|---|---|---|
| Buffer Pointer (Page 0) | | | | 27-24H |
| Buffer Pointer (Page 1) | EndPt | R | Device Address | 2B-28H |
| Buffer Pointer (Page 2) | I/O | Maximum Packet Size | | Mult | 2F-2CH |
| Buffer Pointer (Page 3) | | | Reserved | 33-30H |
| Buffer Pointer (Page 4) | | | Reserved | 37-34H |
| Buffer Pointer (Page 5) | | | Reserved | 3B-38H |
| Buffer Pointer (Page 6) | | | Reserved | 3F-3CH |

FROM FIG. 5A

METHOD AND APPARATUS FOR ITD SCHEDULING

BACKGROUND OF THE INVENTION

1. Field of the Invention

This invention relates to universal serial bus (USB) environments, and more particularly to a method and apparatus to improve performance of an enhanced host controller interface (EHCI) for USB devices.

2. Description of the Related Art

In many of today's processors and systems, such as personal computer (PC) systems, there exist USB ports for connecting various USB devices. Many USB devices are frequently used by PC users. For example, USB devices may be printers, compact disc read-only memory (CD-ROM) drives, CD-ROM writer (CDRW) drives, digital versatile disc (DVD) drives, cameras, pointing devices (e.g., computer mouse), keyboards, joy-sticks, hard-drives, speakers, etc.

Different standards of USB technology have different bandwidths. For example, Universal Serial Bus Specification, revision 1.1, Sep. 23, 1998 (USB 1.1) devices are capable of operating at 12 Mbits/second (Mbps), and Universal Serial Bus Specification, revision 2.0, Apr. 27, 2000 (USB 2.0; also known as high-speed USB) devices are capable of operating at 480 Mbps. USB 2.0 defines a multiple speed-signaling environment where a single high-speed bus may support one or more USB 1.1 classic busses through a USB 2.0 hub (Transaction Translator). In this environment, system software (the Host Controller Driver) must allocate and manage the bandwidth of USB 1.1 classic busses.

The Enhanced Host Controller Interface (EHCI) specification for a Universal Serial Bus, revision 0.95, Nov. 10, 2000, describes the register-level interface for a Host Controller (HC) for USB 2.0. The USB EHCI provides for isochronous data streams. The isochronous data streams are managed using isochronous transaction descriptors (iTDs). A single iTD can not represent all possible starting buffer alignments.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION OF THE INVENTION

The invention generally relates to an apparatus and method to improve bandwidth usage of Universal Serial Bus (USB) devices. Referring to the figures, exemplary embodiments of the invention will now be described. The exemplary embodiments are provided to illustrate the invention and should not be construed as limiting the scope of the invention.

Figure 1:
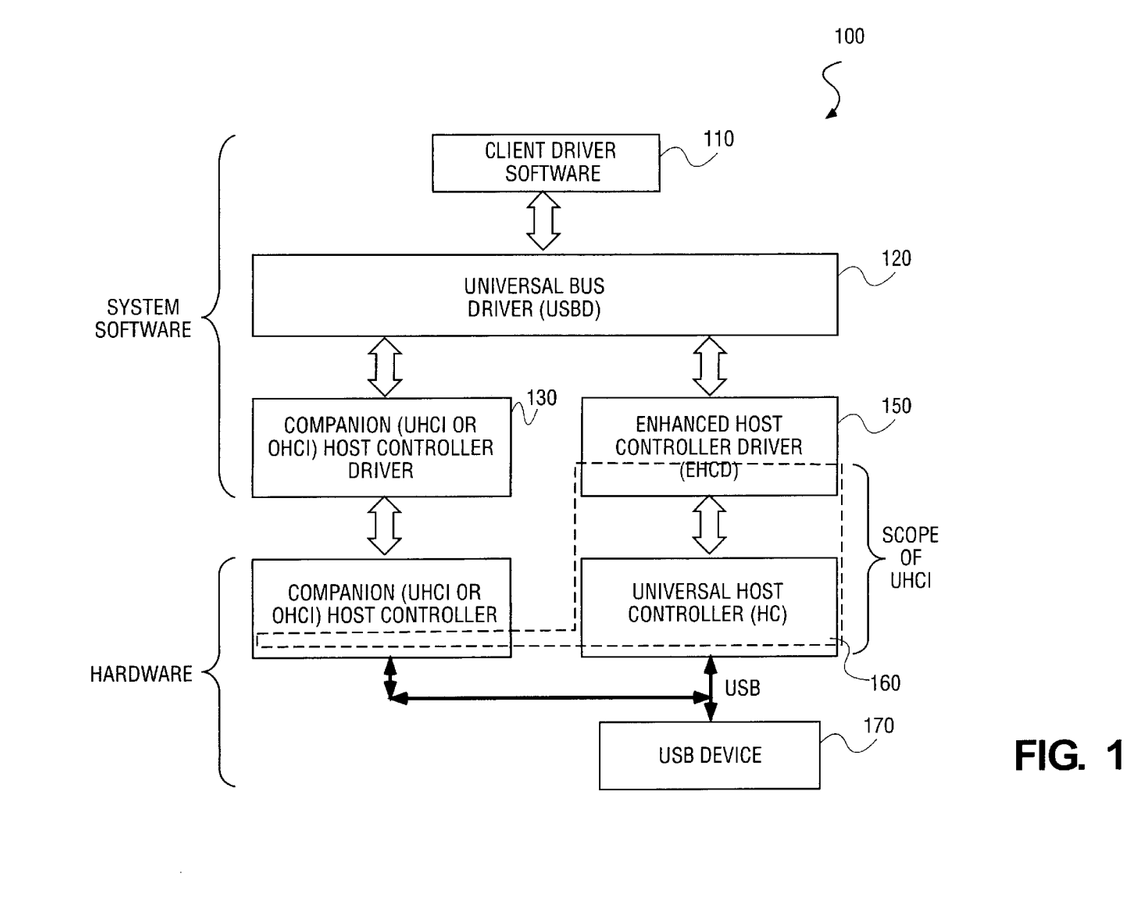
FIG. 1 illustrates a Universal Serial Bus (USB) system.

A typical USB host system is composed of a number of hardware and software layers. FIG. 1 illustrates a block diagram of typical building block layers in a USB 2.0 system. System 100 is comprised of client driver software 110, universal bus driver (USBD) 120, companion host controller (HC) driver 130, companion HC 140, enhanced host controller driver (EHCD) 150, universal host controller (UHC) 160 and USB device 170. A USB is coupled to the USB device and the HCs. In system 100, system software consists of client driver software 110, USBD 120, companion HC driver 130, and EHCD 150. In system 100 the hardware comprises companion HC 140, UHC 160, and USB device 170.

Client driver software 110 typically executes on the host PC corresponding to a particular USB device. Client driver software 110 is typically part of the operating system (OS) or may be provided with a USB device. USBD 120 is a system bus driver that abstracts the details of the particular HC driver for a particular OS. Companion HC driver 130 is typically a UHC interface (UHCI) driver or an open HCI (OHCI) driver for USB. The HC driver provides a software layer between specific HC hardware and the USBD. Companion HC 140, is typically UHCI or OHCI standards. Companion HC 140 is the specific hardware implementation of the HC. There is one HC specification for USB 2.0 functionality, and two specifications for full-and low-speed HCs.

Figure 2:
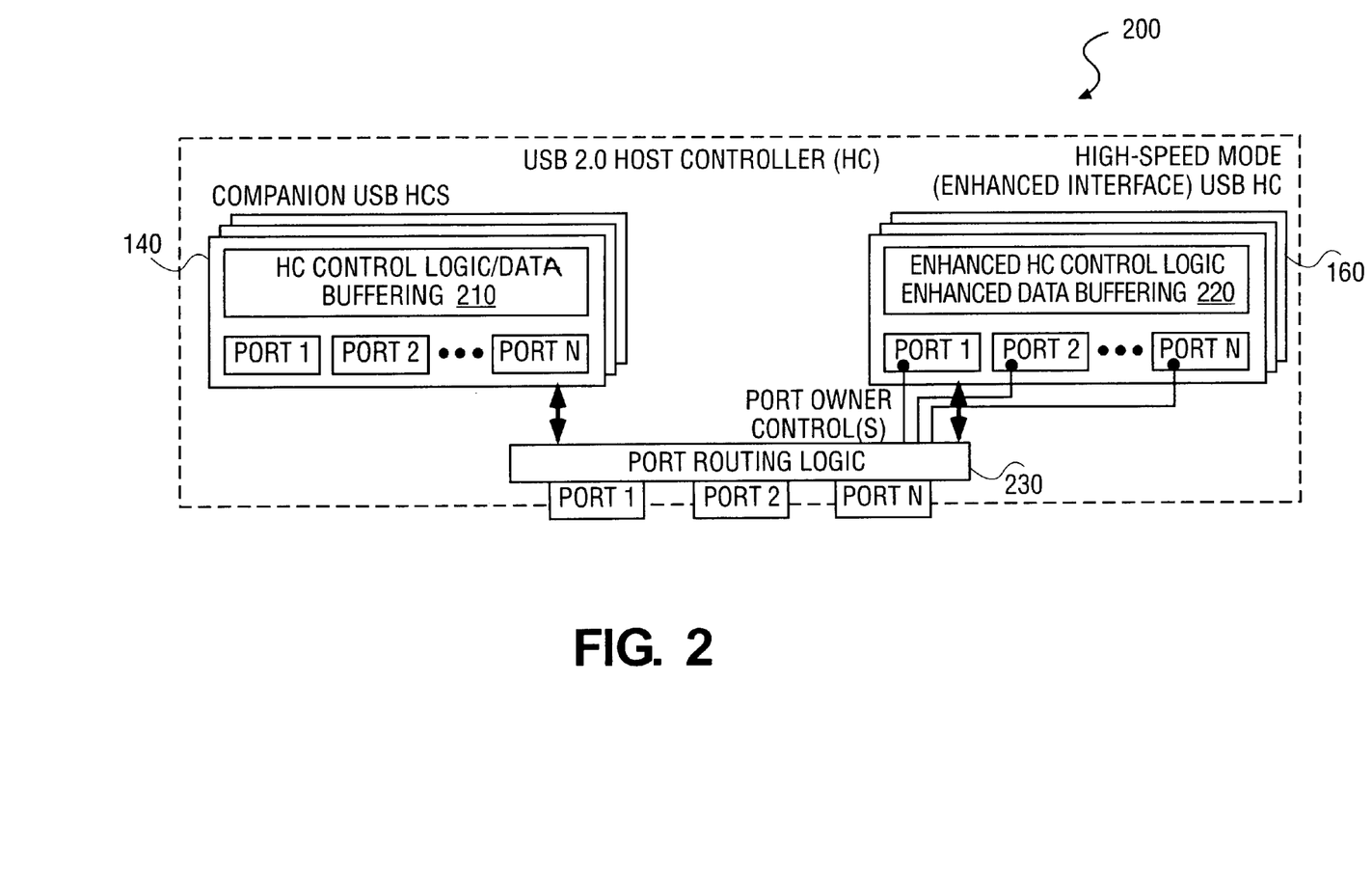
FIG. 2 illustrates a USB host controller.

FIG. 2 illustrates typical USB 2.0 HC 200. A USB 2.0 HC includes one high-speed mode HC and zero (0) or more USB 1.1 HCs. USB 2.0 HC 200 comprises companion USB HC and high-speed mode (enhanced interface) HC 160. Companion HC 140 comprises HC control logic/data buffering 210 (including port 1 through port N). High-speed mode HC 160 comprises enhanced HC control logic/enhanced data buffering 220 (including port 1 through port N). Also included in USB 2.0 HC 200 is port routing logic 230 (including port 1 through port N).

Figure 3:
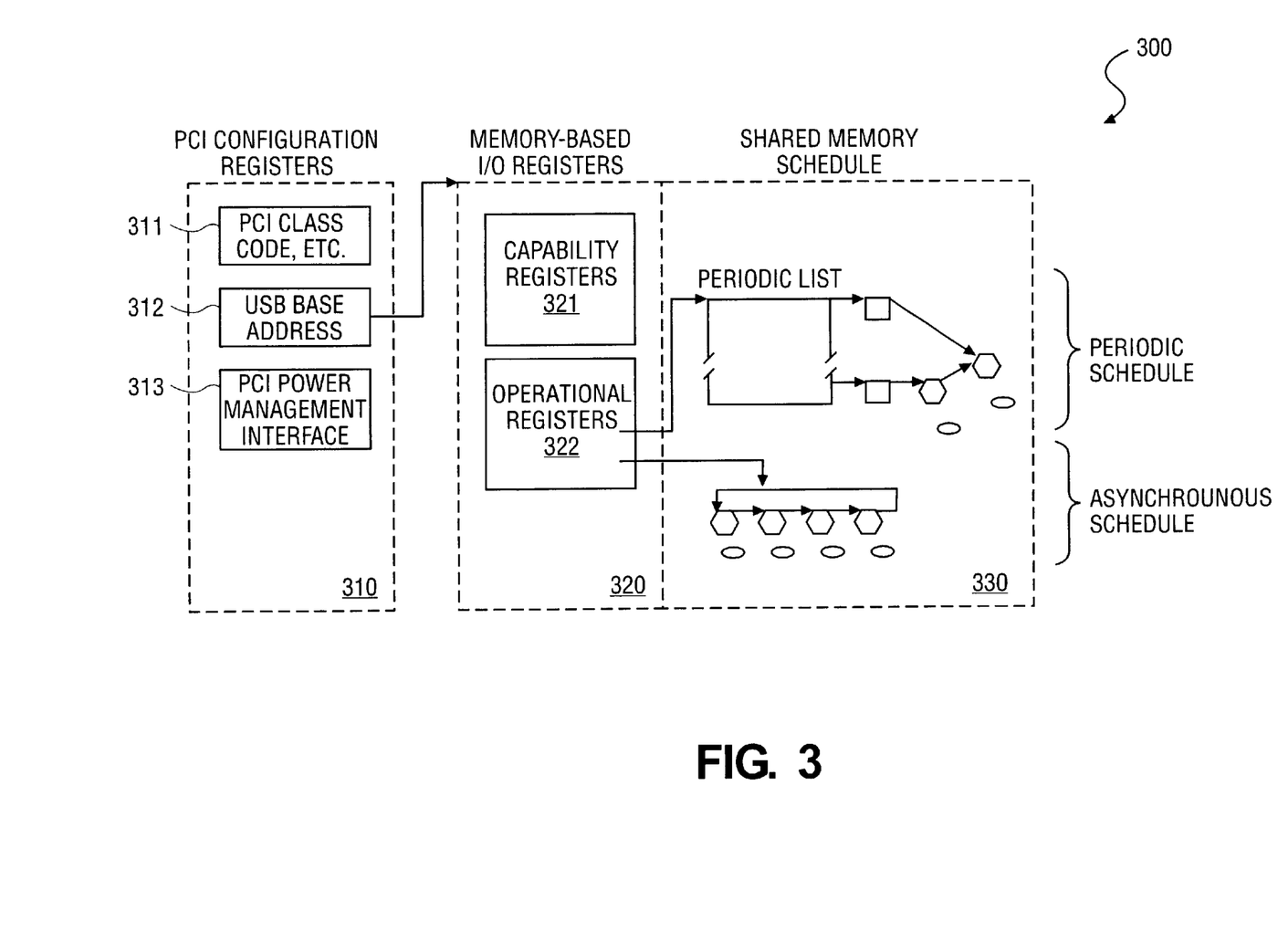
FIG. 3 illustrates an enhanced host controller interface (EHCI).

FIG. 3 illustrates the general architecture of enhanced host controller interface (EHCI) 300. EHCI 300 comprises three interface spaces: peripheral component interconnect (PCI) configuration 310, register 320, and schedule interface 330. PCI configuration 310 includes PCI registers used for system component enumeration and PCI power management. PCI configuration registers in PCI configuration 310 comprise PCI class code 311, USB base address 312, and PCI power management interface 313. Register 320 comprises memory based input/output (I/O) registers. Memory based I/O registers are comprised of capability registers 321 and operational registers 322. Register 320 must be implemented as memory-mapped I/O. Schedule interface 330 is typically memory allocated and managed by the HC driver for the periodic and asynchronous schedules. EHCI 300 allows software to enable or disable each schedule.

Figure 4:
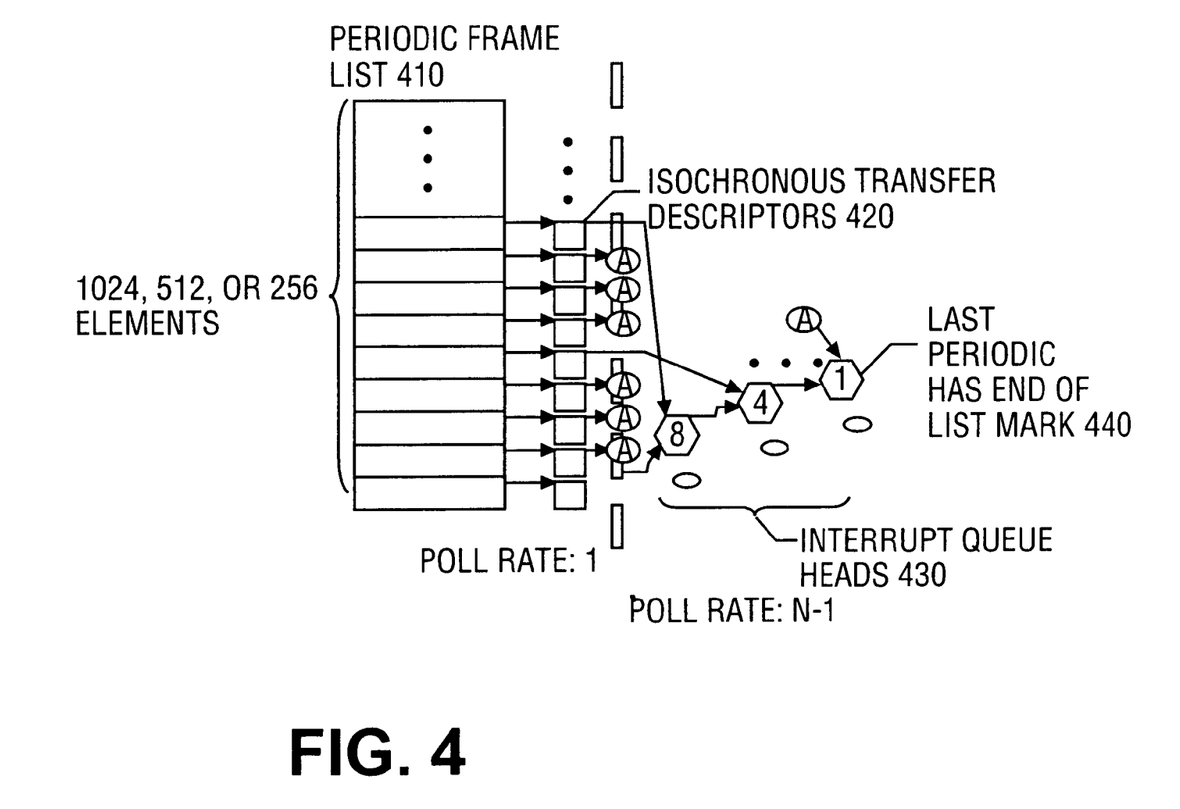
FIG. 4 illustrates a periodic schedule.

FIG. 4 illustrates an example of a periodic schedule. The periodic schedule is used to manage all isochronous and interrupt transfer streams. The base of the periodic schedule is periodic frame list 410. Software links schedule data structures to periodic frame list 410 to produce a graph of scheduled data structures. The graph represents the appropriate sequence of transactions on the USB. Periodic schedule 500 also illustrates isochronous transfers, (using isochronous transaction descriptors (iTDs) and split-iTDs (siTDs)) with a period of one, linked directly to periodic frame list 410. Interrupt transfers (are managed with queue heads) and isochronous streams, with periods other than one, are linked following the period-one iTD/siTDs. Interrupt queue heads 430 are linked into periodic frame list 410 ordered by poll rate. Longer poll rates are linked first (e.g., closest to periodic frame list 410), followed by shorter poll rates, with queue heads with a poll rate of one (1), on the very end.

Figure 5A:
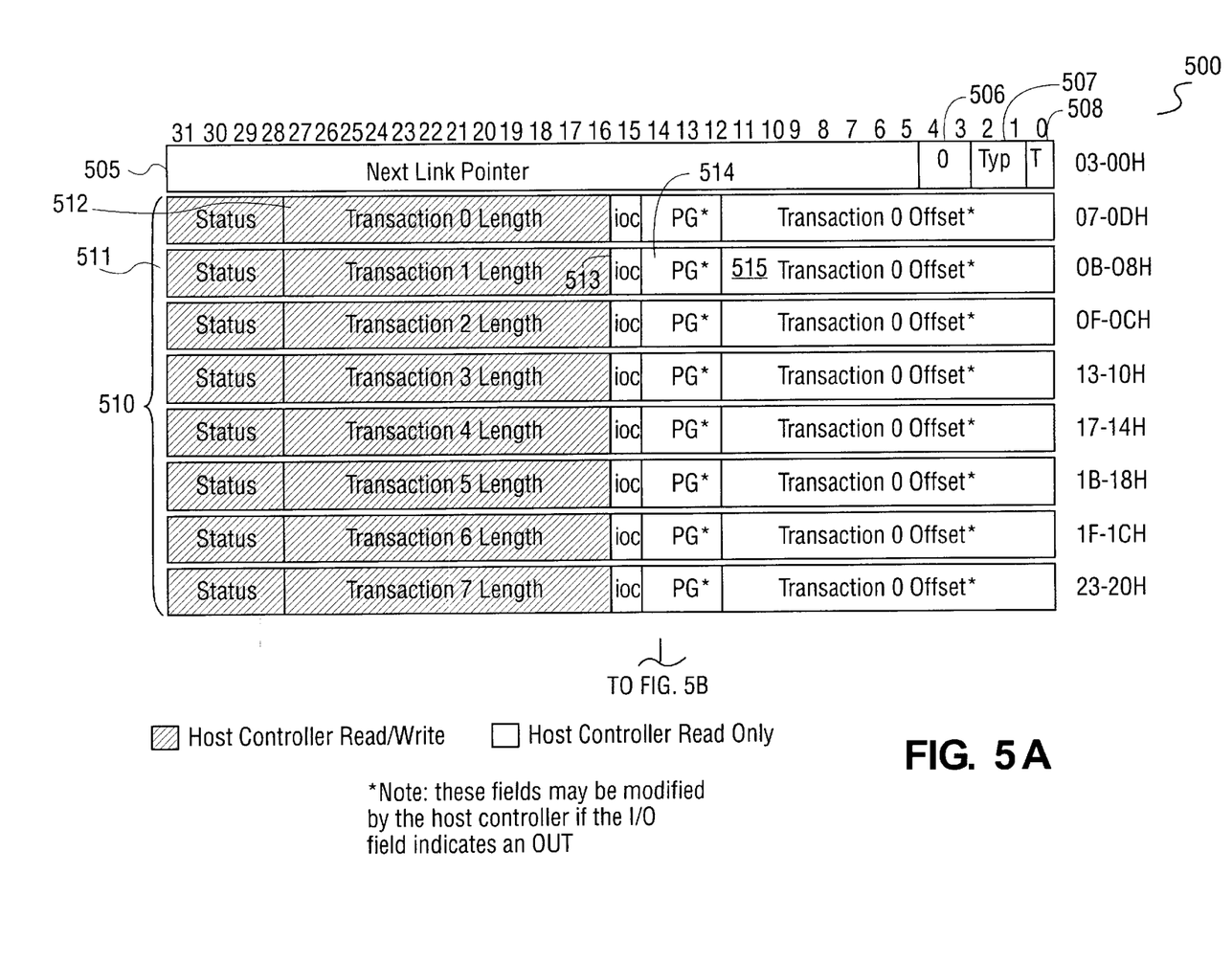
FIGS. 5A–B illustrates a structure of an isochronous transfer descriptor (iTD).
Figure 5B:
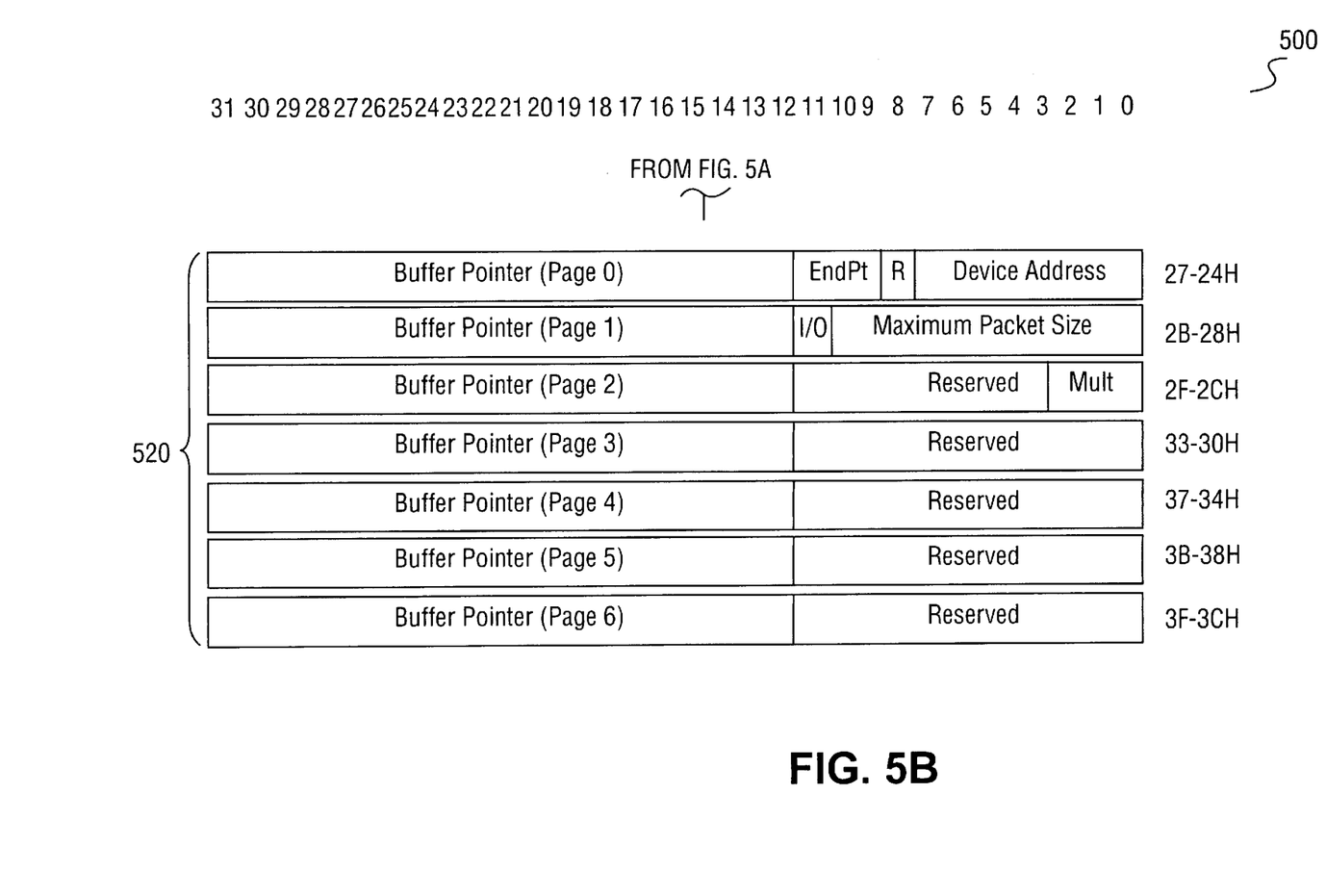

FIGS. 5A–B illustrates the structure of an iTD. The structure illustrated in FIGS. 5A–B is used only for high-speed isochronous endpoints. All other transfer types should use queue structures. Link pointer 505 is a pointer to the next schedule data structure (iTD, siTD, or queue head). Field 506 is reserved. Field 506 indicates to the HC whether the item referenced is an iTD, siTD, or a queue head. By informing the HC of the type of data structure, the HC can perform the proper type of processing on the item after it is fetched. Field 511 records the status of the transaction executed by the HC for the particular slot. Field 512 is the transaction length (i.e., number of data bytes) the HC will send during the transaction. Field 513 is the interrupt on complete (IOC) bit. If the IOC bit is set to a one ("1"), it specifies that when the transaction completes, the HC should issue an interrupt at the next interrupt threshold. Field 514 is the page select.

The page select field 514 are set by software to indicate which of the buffer page pointers the offset field 515 in the particular slot should be concatenated to produce the beginning memory address for the particular transaction. Offset field 515 is a value that is an offset, expressed in bytes, from the beginning of a buffer. Offset field 515 is concatenated onto the buffer page pointer indicated in the page select field 514 to produce the beginning buffer address for the particular transaction. Buffer page pointer list 520 provides 7 page pointers to support the expression of eight ("8") isochronous transfers. The seven pointers allow for three ("3") transactions*1024 (maximum packet size)*eight ("8") transaction records (24,576 bytes) to be moved with this data structure, regardless of the alignment offset of the first page.

Figure 6:
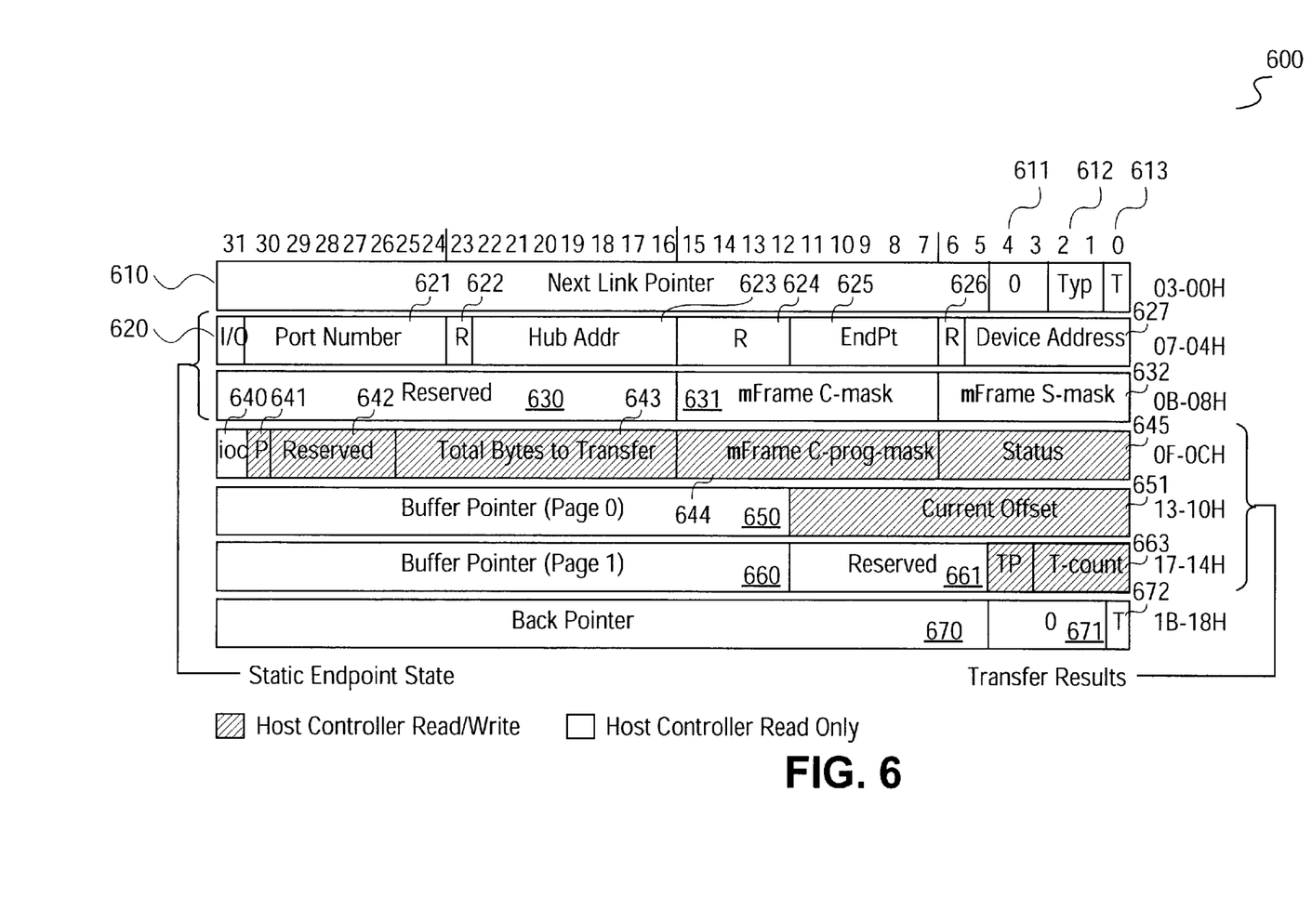
FIG. 6 illustrates a structure of a split-transaction isochronous transfer descriptor (siTD).

FIG. 6 illustrates a siTD. All full-speed isochronous transfers through transaction translators (TTs) are managed using the siTD data structure. Field 610 is the next link pointer. Field 610 contains the address of the next data object to be processed in the periodic list and corresponds to memory address signals [31:5], respectively. Field 611 is reserved. Field 612 is the QH/(s)iTD select. Field 612 indicates to the HC whether the item referenced is a iTD/siTD or QH. Field 613 is the terminate field.

Field 620 is the direction that is input or output. Field 620 encodes whether the full-speed transaction is IN or OUT. Field 621 is the port number of the recipient TT. Field 622 is reserved. Field 623 is the device address of the TT's hub. Field 624 is reserved. Field 625 is a four-bit field that selects the particular endpoint number on the device serving as the data source or sink. Field 626 is reserved. Field 627 selects the specific device serving as the data source or sink.

Field 630 is reserved. Field 631, the split completion mask, and field 632, the split start mask, are used to determine during which micro-frames the HC should execute complete-split transactions. Field 640 is the interrupt on complete field. When field 640 is set to a one (1), the HC will assert a hardware interrupt at the next interrupt threshold when the HC determines that the split transaction has completed. When field 640 is set to a zero (0), the HC will not assert an interrupt when the HC determines that the split transaction has completed. Field 641 is sued to indicate which data page pointer should be concatenated with field 651 (discussed below) to construct a data buffer pointer. Field 642 is reserved. Field 643 is initialized to the total number of bytes expected in the transfer (maximum value is 1023). Field 643 is used by the HC to record which split-completes have been executed. Field 644 records the status of the transaction executed by the HC for this slot.

Field 650 is the buffer pointer list for page 0. Field 651 is the current offset field. In field 651, the twelve least significant bits of the Page 0 pointer is the current byte offset for the current page pointer. Field 660 is the buffer pointer list for Page 1. Field 661 is reserved. Field 662 is the transaction position. Field 662 is used with field 663 to determine whether to send all, first, middle, or last with each outbound transaction payload. Field 663 is initialized by software with the number of OUT start-splits the transfer requires. Field 670 is the siTD back pointer. Field 670 is a physical memory pointer to a siTD. Field 671 is reserved. Field 672 is a terminate field.

The USB 2.0 EHCI is a bus master on the PCI bus. The USB 2.0 EHCI independently traverses linked memory structures created and maintained by the HC driver to initiate transactions on the USB. The USB 1.1 specification specifies a frame time of 1 ms. The USB 1.1 specification also defines isochronous traffic to a single endpoint, defined as 1 packet per frame. The USB 2.0 specification defines a micro-frame to be 125 $\mu$s. Micro-frames are superimposed over frame times. There are eight (8) micro-frames per classic frame (i.e., a 1 ms. frame time).

The isochronous data streams are managed by an array in memory, i.e. the frame list. The frame list is an array of pointers. Each frame list location corresponds to a 1 ms. frame time (i.e., classic frame). Each location has a pointer to a chain of other data structures. Each data structure has information that directs the HC to execute transactions on the USB. Data structures reachable from a frame list location represent all of the scheduled transactions for a specific frame time. The HC keeps a pointer to the base of the frame list and an internal register keeps the current offset into the frame list. The offset register is incremented each frame time.

At the beginning of each micro-frame, the HC begins traversing data structures beginning at the current entry (as indicated by the offset register) in the frame list. This means that each entry in the frame list (and the chained data structures that it points to) is traversed eight (8) times, i.e. once per micro-frame.

An iTD represents eight (8) micro-frames worth of isochronous data to a single, high-speed endpoint. Each iTD contains a pointer (illustrated as 505 in FIG. 5A) to the next scheduled data structure, and is linked in a chain that is based from a location in the frame list. Within the iTD there are eight (8) sub-structures that represent each micro-frame's transaction (illustrated as 511 in FIG. 5A). The iTD contains seven (7) page (4k bytes) aligned buffer pointers (illustrated as 520 in FIG. 5B). Each micro-frame transaction can take up to 3k bytes of memory and involve a page cross.

The iTD data structure, however, does not provide full support for all possible starting buffer alignments. For example, a first buffer is posted to an HC driver. The first buffer contains one (1) micro-frame (3k bytes) worth of data. Given a worst case buffer alignment, this will require two (2) of the possible seven (7) available buffer pointers of an iTD.

A second buffer is then posted to the HC driver for the same endpoint. This second buffer contains seven (7) micro-frame's worth of data. Therefore, in the worst case offset, the second buffer will require seven (7) micro-frames*3k bytes/4k bytes+1=6.25, or 7 page pointers, which is two more than available.

In one embodiment of the invention a HC daisy chains partially initialized iTDs together into a single classic frame. In this embodiment of the invention, various physical alignments of buffers are allowable. In one embodiment of the invention, three conditions for various aligned buffers are supported. These three conditions are: 1) a stream of buffers that begin in the middle of a classic frame; 2) buffers that are variable sized; and 3) buffers that are greater than one (1) micro-frame, but less than eight (8) micro-frames. In this embodiment of the invention, iTDs are scheduled dynamically. In other words, iTDs are added and removed from the frame list as buffers are submitted to the HC driver.

Figure 7:
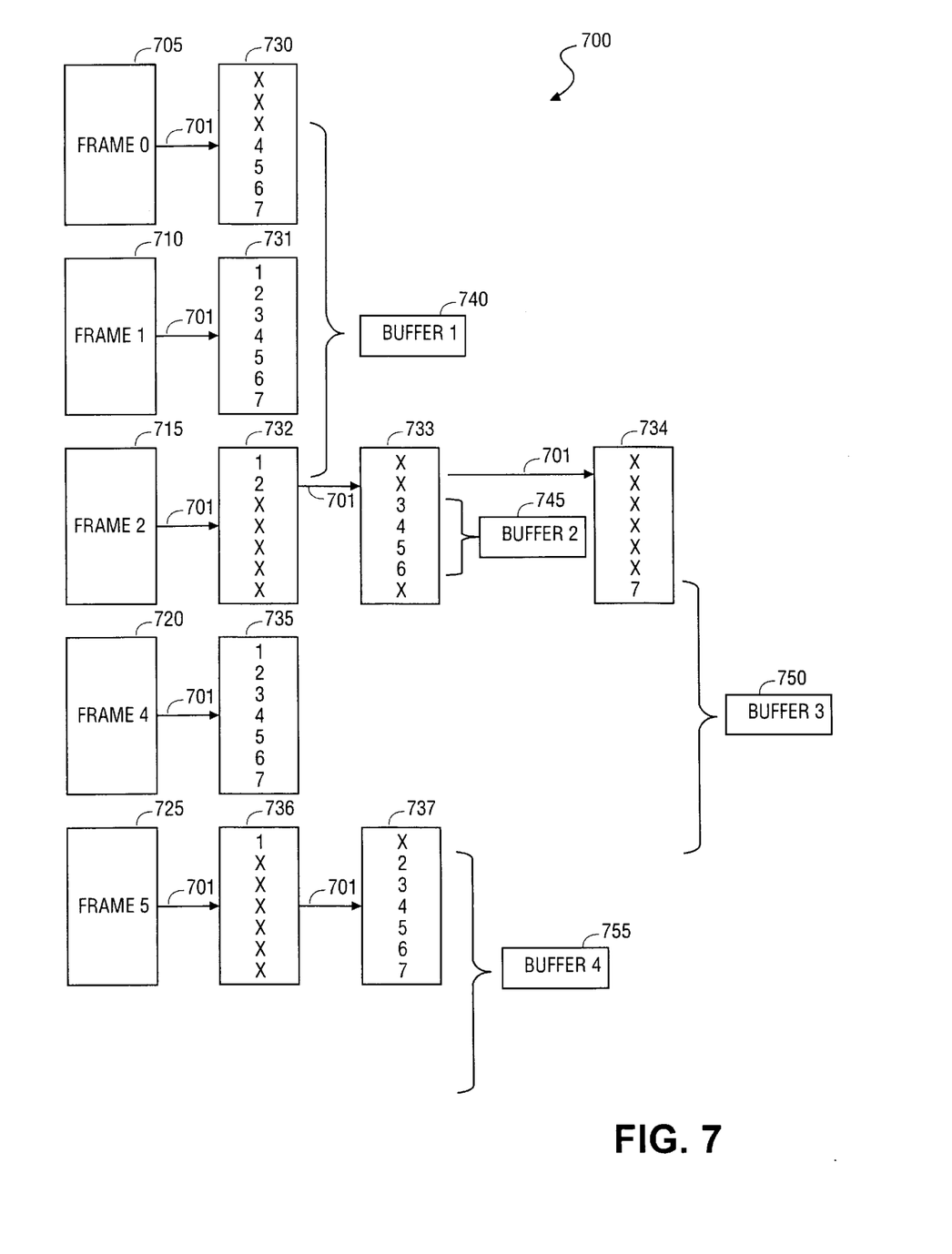
FIG. 7 illustrates an example of an embodiment of the invention daisy chaining partially initialized iTDs.

FIG. 7 illustrates an example of an embodiment of the invention daisy chaining partially initialized iTDs. Entries 705, 710, 715, 720 and 725 are entries in a frame list. Arrows 701 represent link pointers. Boxes 730–737 represent iTDs. Each iTD contains eight (8) entries, each representing the transaction to be executed during the specified micro-frames within a frame. Entries designated with an "x" indicate that the transaction for that particular micro-frame is inactive, thus, ignored by the HC.

As the HC traverses the data structures (once per micro-frame or eight (8) times per frame), the HC executes all active transactions. As illustrated in FIG. 7, buffer-1 740 spans the last four entries in iTD 730, which is attached to frame-0 705, completely fills iTD 731, which is connected to frame-1 710, and spans the first two entries in iTD 732, which is connected to frame-2 715. Buffer-2 745 is much smaller than buffer-1 740. Buffer-2 745 fills micro-frames 3, 4, 5 and 6 of iTD 733, which is connected to frame-2 715. Buffer-3 750 fills the last micro-frame of iTD 734, which is connected to frame-2 715, and all the micro-frames in iTD 735, which is connected to frame-4 720. Buffer-4 755 fills the first micro-frame of iTD 736, which is connected to frame-5 725, and micro-frames 2–7 in iTD 737.

Figure 8:
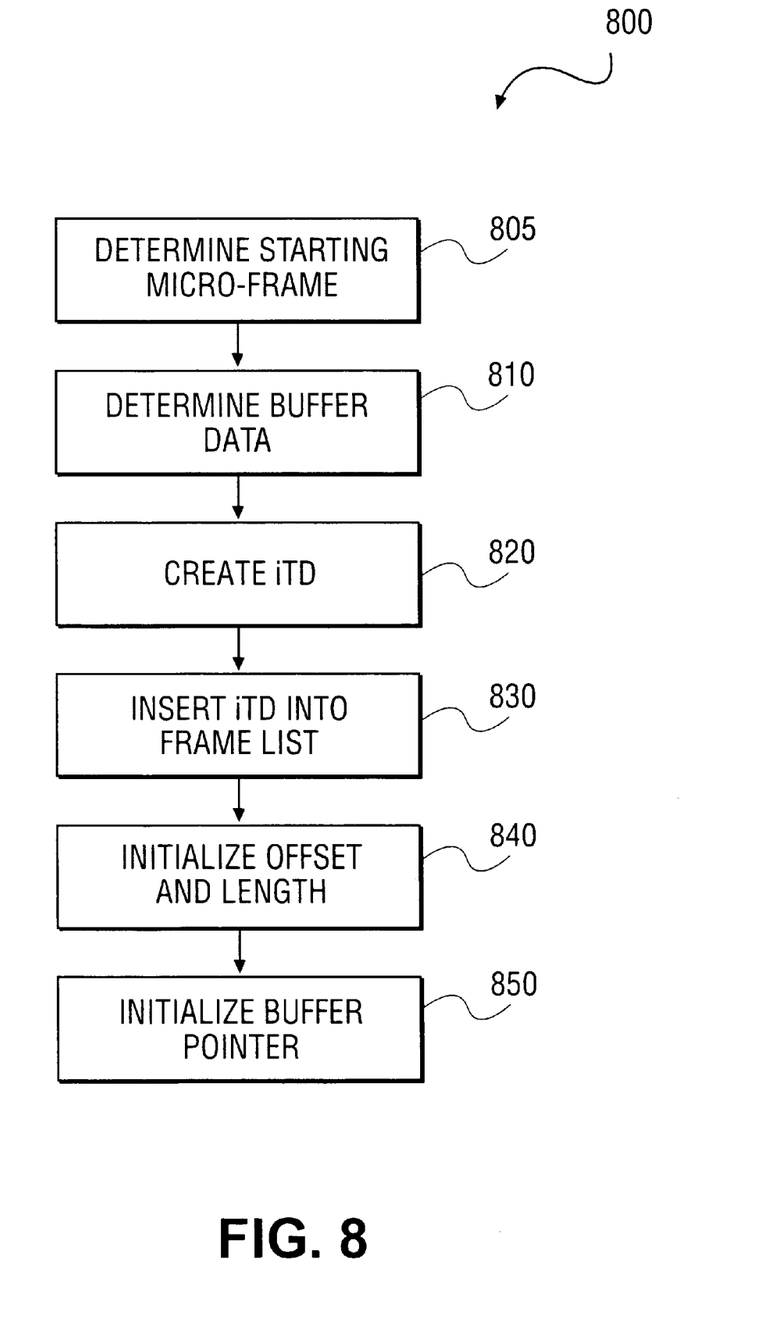
FIG. 8 illustrates a block diagram of an embodiment of the invention.

FIG. 8 illustrates a block diagram of an embodiment of the invention. Process 800 begins with block 805. In block 805, process 800 determines the starting micro-frame. Process 800 continues with block 810, which determines buffer data. In block 810, the HC driver receives an array of information, such as offsets into buffers and length of transactions. Process 800 continues with block 820 where an iTD is created with its link pointer pointing to the next chained iTD. Process 800 then continues with block 830 where the iTD that was created in block 820 is inserted into the frame list. Block 840 initializes the offset and length for each transaction in the iTD. Process 800 then continues with block 850 where the buffer pointer is initialized.

In the EHCI 2.0 specification, because a single iTD can not represent all possible buffer alignments, the HC driver imposes three restrictions on streamed buffers from a higher level driver. First, all buffers must be a certain integral number of classic frames. Second, all buffers must start on a classic frame boundary. And third, all buffers must be larger than one classic frame in size. In one embodiment of the invention, these three restrictions are removed to allow for various physical alignments of buffers. Therefore, the embodiments of the invention improve HC performance. One should note that one embodiment of the invention can be implemented in a device, such as HC 200 illustrated in FIG. 2. Also, one embodiment of the invention can be implemented in a system, such as system 100 illustrated in FIG. 1.

The above embodiments can also be stored on a device or machine-readable medium and be read by a machine to perform instructions. The machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.). The device or machine-readable medium may include a solid state memory device and/or a rotating magnetic or optical disk. The device or machine-readable medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
    a host controller to generate a transaction schedule, the transaction schedule including a plurality of transactions, the plurality of transactions are stored in a plurality of data structures, each of the plurality of data structures contain one of initialized transactions and initialized and non-initialized transactions, the plurality of data structures are isochronous transaction descriptors (iTDs),
    wherein the host controller executes the transactions that are initialized and the plurality of data structures each contain a pointer to a next initialized transaction and the host controller generates a plurality of buffers that contain a plurality of transactions that are greater than one micro-frame and less than eight micro-frames.

2. The apparatus of claim 1, further comprising a host controller driver coupled to the host controller.

3. The apparatus of claim 1, wherein various physical buffer alignments are produced in the transaction schedule.

4. The apparatus of claim 1, wherein the host controller generates a stream of buffers that begin in a middle of a classic frame.

5. The apparatus of claim 1, wherein the host controller generates a plurality of buffers that are variably sized.

6. A method comprising:
    determining a starting micro-frame;
    receiving buffer data;
    creating at least one isochronous transaction descriptor (iTD) based on the starting micro-frame and buffer data;
    inserting the at least one iTD into a frame list,
    initializing an offset and a length; and
    initializing a buffer pointer
    wherein the at least one iTD contains one of initialized transactions and initialized and non-initialized transactions, the iTD is daisy chained with at least one other iTD into at least one buffer and inserted into a single classic frame, and a plurality of buffers are generated that contain a plurality of transactions that are greater than one micro-frame and less than eight micro-frames.

7. The method of claim 6, wherein various physical buffer alignments are produced by daisy chaining.

8. The method of claim 6, wherein a stream of buffers that begin in a middle of a classic frame are supported.

9. The method of claim 6, wherein buffers that are variably sized are supported.

10. An apparatus comprising a machine-readable medium containing instructions which, when executed by a machine, cause the machine to perform operations comprising:

determining a starting micro-frame;

receiving buffer data;

creating at least one isochronous transaction descriptor (iTD) based on the starting micro-frame and buffer data;

inserting the at least one iTD into a frame list, wherein the at least one iTD contains one of initialized transactions and initialized and non-initialized transactions, the at least one iTD is daisy chained with at least one other iTD into at least one buffer and inserted into a single classic frame, and a plurality of buffers are generated that contain a plurality of transactions that are greater than one micro-frame and less than eight micro-frames.

11. The apparatus of claim 10, further containing instructions which, when executed by a machine, cause the machine to perform operations including:

initializing an offset and a length; and initializing a buffer pointer.

12. The apparatus of claim 10, wherein various physical buffer alignments are produced by daisy chaining.

13. The apparatus of claim 10, wherein a stream of buffers that begin in a middle of a classic frame are supported.

14. The apparatus of claim 10, wherein buffers that are variably sized are supported.

15. A system comprising:

a host controller coupled to a bus, the host controller generates a transaction schedule, the transaction schedule including a plurality of transactions, the plurality of transactions are stored in a plurality of data structures, each of the plurality of data structures contain one of a plurality of initialized transactions, and a plurality of initialized and non-initialized transactions, the plurality of data structures are isochronous transaction descriptors (iTDs);

a device coupled to the bus, the bus is a universal serial bus (USB); and a host controller driver coupled to the host controller, wherein the host controller executes the transactions that are initialized and the plurality of data structures each contain a pointer to a next initialized transaction and the host controller generates a plurality of buffers that contain a plurality of transactions that are greater than one micro-frame and less than eight micro-frames.

16. The system of claim 15, wherein the are daisy chained into a single classic frame.

17. The system of claim 15, wherein various physical buffer alignments are produced in the transaction schedule.

18. The system of claim 15, wherein the host controller generates a stream of buffers that begin in a middle of a classic frame.

19. The system of claim 15, wherein the host controller generates a plurality of buffers that are variably sized.

* * * * *